United States Patent
Ylipekkala et al.

(10) Patent No.: US 11,032,313 B2
(45) Date of Patent: Jun. 8, 2021

(54) DYNAMIC REMOTE MALWARE SCANNING

(71) Applicant: F-Secure Corporation, Helsinki (FI)

(72) Inventors: Juha Ylipekkala, Helsinki (FI);
Jammu Kekkonen, Helsinki (FI);
Andrew Patel, Helsinki (FI); Jarno Niemela, Kirkkonummi (FI); Jari Savander, Helsinki (FI); Jani Jappinen, Helsinki (FI); Juho Heikkinen, Helsinki (FI); Zimry Ong, Helsinki (FI)

(73) Assignee: F-Secure Corporation, Helsinki (FI)

( * ) Notice: Subject to any disclaimer, the term of this patent is extended or adjusted under 35 U.S.C. 154(b) by 946 days.

(21) Appl. No.: 15/046,918

(22) Filed: Feb. 18, 2016

(65) Prior Publication Data

US 2016/0248786 A1  Aug. 25, 2016

(30) Foreign Application Priority Data

Feb. 20, 2015 (GB) ...................................... 1502889

(51) Int. Cl.
*H04L 29/06* (2006.01)

(52) U.S. Cl.
CPC ........ *H04L 63/145* (2013.01); *H04L 63/1416* (2013.01)

(58) Field of Classification Search
None
See application file for complete search history.

(56) References Cited

U.S. PATENT DOCUMENTS

| 7,020,895 B2 | 3/2006 | Albrecht ........................ 726/22 |
| 2001/0005889 A1* | 6/2001 | Albrecht ................. G06F 21/56 726/24 |
| 2007/0038637 A1 | 2/2007 | Taneja et al. ................... 707/10 |
| 2007/0266436 A1 | 11/2007 | Ballard et al. .................. 726/24 |
| 2010/0077482 A1 | 3/2010 | Adams ............................ 726/24 |
| 2011/0033128 A1* | 2/2011 | Watkins ........... G06F 17/30212 382/254 |
| 2013/0019306 A1 | 1/2013 | Lagar-Cavilla et al. ....... 726/22 |

FOREIGN PATENT DOCUMENTS

WO  WO2014168408 A1 *  4/2014
WO  WO 2014/168408 A1  10/2014

* cited by examiner

*Primary Examiner* — Joseph P Hirl
*Assistant Examiner* — Hassan Saadoun
(74) *Attorney, Agent, or Firm* — Harrington & Smith (57) ABSTRACT

There are provided measures for enabling dynamic remote malware scanning. Such measures could exemplarily include identification of an electronic file to be scanned for malware, generation of at least one scanning object of the identified electronic file on the basis of a dynamic configuration by a remote entity, said at least one scanning object being generated by using malware-susceptible data of the identified electronic file and neglecting malware-insusceptible data of the identified electronic file, transfer of the at least one scanning object of the identified electronic file for remote malware scanning to the remote entity, and execution of a malware scan of the at least one scanning object of the electronic file at the remote entity by a malware scanning engine or application.

20 Claims, 6 Drawing Sheets

DYNAMIC REMOTE MALWARE SCANNING

FIELD

The present invention relates to dynamic remote malware scanning. More specifically, the present invention relates to measures (including methods, apparatuses and computer program products) for enabling dynamic remote malware scanning.

BACKGROUND

Nowadays, malware scanning is a vital issue in any kind of networks, and is generally directed to identify (and potentially also disinfect) any kind of malware on computer and/or communication systems, such as e.g. viruses, Trojans, worms, or the like. Malware scanning techniques can basically be distinguished in local and remote malware scanning techniques. In local techniques, malware scanning is performed by a dedicated program or application being locally installed on the system to be scanned (i.e. a host). In remote techniques, malware scanning is performed by a dedicated engine or application being arranged on a specific server or any other kind of entity which is remotely connected with the system to be scanned via a network (wherein such entity and the system to be scanned can but do not need to be located at different locations).

Remote malware scanning techniques have various advantages over local malware scanning techniques. For example, it is advantageous that only a limited number of remote malware scanning engines or applications needs to be implemented for enabling remote scanning of a greatly larger number of hosts. Further, it is advantageous that reverse engineering of locally installed malware scanning programs or applications at hosts e.g. by a malware author or any malicious entity (for recognizing underlying malware scanning mechanisms for the purpose of circumventing the same) is prevented (as no such local programs or applications are installed and used), thus improving security and reliability Yet, remote malware scanning techniques require the communication of data over the network from the system to be scanned to the remote entity performing the remote scanning. In conventional remote malware scanning techniques, it is typically required to upload the entire file to be scanned, thus incurring significant traffic over the network, especially when a large number of hosts are subject to remote malware scanning.

Accordingly, it is desirable to reduce the amount of data to be sent over the network for enabling remote malware scanning, thus reducing required traffic and bandwidth (and speeding up remote malware scanning).

While a technique for reducing the amount of data to be sent over the network for enabling remote malware scanning has been proposed (e.g. in U.S. Pat. No. 7,020,895 B1), such technique could delay the remote malware scanning, as the entire processing intelligence is solely located at the remote entity, and thus a sequential communication, including a sequential transfer of various file portions to be scanned, is required over the network. Even worse, such technique is based on static mechanisms both at the host and the remote entity performing the remote scanning. Accordingly, such static mechanisms can be spied out e.g. by a malware author or any malicious entity, and the security and reliability can thus be corrupted.

Accordingly, it is desirable to enable dynamic remote malware scanning, thus impeding corruption of security and reliability.

SUMMARY

Various exemplifying embodiments of the present invention aim at addressing at least part of the above issues and/or problems.

Various aspects of exemplifying embodiments of the present invention are set out in the appended claims.

According to a first aspect of the present invention there is provided a method of scanning an electronic file for malware in a network, the method comprising: generating one or more scanning objects of the electronic file on the basis of a dynamic configuration provided to a first node of the network by a second node of the network, the dynamic configuration defining malware-susceptible data of the electronic file, and the scanning object(s) being generated by using the malware-susceptible data of the electronic file and neglecting malware-insusceptible data of the electronic file; generating a signature of the scanning object(s); and, if the signature matches a previously identified signature, determining whether or not the electronic file is malware based on an indication associated with the matching previously identified signature, or receiving an indication from the second node of whether or not the electronic file is malware; and, if the signature does not match a previously identified signature, sending the scanning object(s) to the second node for scanning and receiving a scanning result from the second node.

The method may further comprise determining if the signature matches a previously identified signature.

The method may further comprise sending a request to the second node for a determination of whether the signature matches a previously identified signature, and receiving a determination result from the second node. The indication from the second node of whether or not the electronic file is malware may be received together with the determination result.

According to a further development and/or a modification, the above method may further comprise: retrieving, at the first node, relevant file information for the identified electronic file, transferring the retrieved relevant file information from the first node to the second node, receiving one or more instructions for generation of at least one scanning object of the identified electronic file from the second node at the first node, and setting the dynamic configuration on the basis of the received one or more instructions. The relevant file information may include one or more of file type/format, file size, file permissions, libraries used, file structure, file header, and file path. The one or more instructions may include at least one of an instruction on whether or not the one or more scanning objects are to be generated for the electronic file and an instruction on how the one or more scanning objects are to be generated for the electronic file. The instruction on how the one or more scanning objects are to be generated for the identified electronic file may include at least one of an indication of malware-susceptible data to be used and/or malware-insusceptible data to be neglected and an indication of type/format and/or structure and/or contents of the at least one scanning object to be generated.

According to a further development and/or a modification, in the above method, generating at least one scanning object of the identified electronic file may comprise at least one of picking, from the electronic file, malware-susceptible data of the electronic file, and creating a skeleton version of the electronic file by copying malware-susceptible data of the electronic file into the skeleton version and omitting malware-insusceptible data of the electronic file from the skeleton version.

The electronic file to be scanned may comprise a file of at least one of an Android Application Package (APK), a Portable Executable (PE), a Microsoft Soft Installer (MSI) or any other format capable of, distributing and/or installing application software or middleware on a computer.

The first node may comprise a malware scanning agent, and the second node may comprise a malware scanning engine or application.

The method may be performed at the first node.

According to a second aspect of the present invention there is provided an apparatus, comprising: a memory configured to store computer program code; and a processor configured to read and execute computer program code stored in the memory, wherein the processor is configured to cause the apparatus to perform: generating one or more scanning objects of the electronic file on the basis of a dynamic configuration provided to a first node of a network by a second node of the network, the dynamic configuration defining malware-susceptible data of the electronic file, and the scanning object(s) being generated by using the malware-susceptible data of the electronic file and neglecting malware-insusceptible data of the electronic file; generating a signature of the scanning object(s); and, if the signature matches a previously identified signature, determining whether or not the electronic file is malware based on an indication associated with the matching previously identified signature, or receiving an indication from the second node of whether or not the electronic file is malware; and if the signature does not match a previously identified signature, sending the scanning object(s) to the second node for scanning and receiving a scanning result from the second node.

The processor may be further configured to cause the apparatus to perform: determining if the signature matches a previously identified signature.

The processor may be further configured to cause the apparatus to perform: sending a request to the second node for a determination of whether the signature matches a previously identified signature, and receiving a determination result from the second node. The indication from the second node of whether or not the electronic file is malware may be received together with the determination result.

According to a third aspect of the present invention, there is provided a computer program, comprising instructions which, when executed on at least one processor, is configured to cause the processor to carry out a method according to any the first aspect of the present invention, including any developments and/or a modifications thereof.

Any one of the computer program products may comprise or may be embodied as a (tangible/non-transitory) computer-readable (storage) medium or the like, on which the computer-executable computer program code is stored, and/or the program is directly loadable into an internal memory of the computer or a processor thereof.

According to an example aspect, there is provided a method of remote malware scanning, the method comprising: identifying, at a first node of a network, an electronic file to be scanned for malware, generating, at the first node of the network, at least one scanning object of the identified electronic file on the basis of a dynamic configuration by a second node of the network, said at least one scanning object being generated by using malware-susceptible data of the identified electronic file and neglecting malware-insusceptible data of the identified electronic file, and transferring the at least one scanning object of the identified electronic file for remote malware scanning thereof from the first node to the second node.

According to a further development and/or a modification, the above method may further comprise: retrieving, at the first node, relevant file information for the identified electronic file, transferring the retrieved relevant file information from the first node to the second node, receiving one or more instructions for generation of at least one scanning object of the identified electronic file from the second node at the first node, and setting the dynamic configuration on the basis of the received one or more instructions. The relevant file information may include one or more of file type/format, file size, file permissions, libraries used, file structure, file header, and file path. The one or more instructions may include at least one of an instruction on whether or not the one or more scanning objects are to be generated for the electronic file and an instruction on how the one or more scanning objects are to be generated for the electronic file. The instruction on how the one or more scanning objects are to be generated for the identified electronic file may include at least one of an indication of malware-susceptible data to be used and/or malware-insusceptible data to be neglected and an indication of type/format and/or structure and/or contents of the at least one scanning object to be generated.

According to a further development and/or a modification, in the above method, generating at least one scanning object of the identified electronic file may comprise at least one of picking, from the electronic file, malware-susceptible data of the electronic file, and creating a skeleton version of the electronic file by copying malware-susceptible data of the electronic file into the skeleton version and omitting malware-insusceptible data of the electronic file from the skeleton version.

The electronic file to be scanned may comprise a file of at least one of an Android Application Package (APK), a Portable Executable (PE), a Microsoft Soft Installer (MSI) or any other format capable of distributing and/or installing application software or middleware on a computer.

The first node may comprise a malware scanning agent, and the second node may comprise a malware scanning engine or application.

According to another example, there is provided a method of remote malware scanning, the method comprising: dynamically configuring, at a second node of a network, generation of at least one scanning object of an electronic file to be scanned for malware at a first node of the network, said generation including using malware-susceptible data of the electronic file and neglecting malware-insusceptible data of the electronic file, receiving the generated at least one scanning object of the electronic file from the first node at the second node, and performing, at the second node, a malware scan of the received at least one scanning object of the electronic file.

The method may further comprise: receiving relevant file information for an identified electronic file to be scanned from the first node at the second node, retrieving one or more instructions for generation of at least one scanning object of the identified electronic file on the basis of the received relevant file information, and transferring the retrieved one or more instructions from the second node to the first node for setting a dynamic configuration for generation of at least one scanning object of the identified electronic file at the first node. Said relevant file information may include one or more of file type/format, file size, file permissions, libraries used, file structure, file header, and file path. Said one or more instructions may include at least one of an instruction on whether or not the at least one scanning object is to be generated for the identified electronic file and an instruction on how the at least one scanning object is to be generated for the identified electronic file. Said instruction on how the at least one scanning object is to be generated for the identified electronic file may include at least one of an indication of malware-susceptible data to be used and/or malware-insusceptible data to be neglected and an indication of type/format and/or structure and/or contents of the at least one scanning object to be generated.

Dynamically configuring generation of at least one scanning object may comprise dynamically configuring at least one of: picking, from the electronic file, malware-susceptible data of the electronic file, and creating a skeleton version of the electronic file by copying malware-susceptible data of the electronic file into the skeleton version and omitting malware-insusceptible data of the electronic file from the skeleton version.

According to an example aspect, there is provided an apparatus comprising a memory configured to store computer program code, and a processor configured to read and execute computer program code stored in the memory, wherein the processor is configured to cause the apparatus to perform: identifying, at a first node of a network, an electronic file to be scanned for malware, generating, at the first node of the network, at least one scanning object of the identified electronic file on the basis of a dynamic configuration by a second node of the network, said at least one scanning object being generated by using malware-susceptible data of the identified electronic file and neglecting malware-insusceptible data of the identified electronic file, and transferring the at least one scanning object of the identified electronic file for remote malware scanning thereof from the first node to the second node.

According to a further development and/or a modification, the processor may be configured to cause the apparatus to perform: retrieving, at the first node, relevant file information for the identified electronic file, transferring the retrieved relevant file information from the first node to the second node, receiving one or more instructions for generation of at least one scanning object of the identified electronic file from the second node at the first node, and setting the dynamic configuration on the basis of the received one or more instructions.

According to a further development and/or a modification, the processor may be configured to cause the apparatus to perform the generating by at least one of picking, from the electronic file, malware-susceptible data of the electronic file, and creating a skeleton version of the electronic file by copying malware-susceptible data of the electronic file into the skeleton version and omitting malware-insusceptible data of the electronic file from the skeleton version.

According to an example aspect, there is provided an apparatus comprising a memory configured to store computer program code, and a processor configured to read and execute computer program code stored in the memory, wherein the processor is configured to cause the apparatus to perform: dynamically configuring, at a second node of a network, generation of at least one scanning object of an electronic file to be scanned for malware at a first node of the network, said generation including using malware-susceptible data of the electronic file and neglecting malware-insusceptible data of the electronic file, receiving the generated at least one scanning object of the electronic file from the first node at the second node, and performing, at the second node, a malware scan of the received at least one scanning object of the electronic file.

According to a further development and/or a modification, the processor may be configured to cause the apparatus to perform: receiving relevant file information for an identified electronic file to be scanned from the first node at the second node, retrieving one or more instructions for generation of at least one scanning object of the identified electronic file on the basis of the received relevant file information, and transferring the retrieved one or more instructions from the second node to the first node for setting a dynamic configuration for generation of at least one scanning object of the identified electronic file at the first node.

According to a further development and/or a modification, the processor may be configured to cause the apparatus to perform the dynamically configuring of at least one of picking; from the electronic file, malware-susceptible data of the electronic file, and creating a skeleton version of the electronic file by copying malware-susceptible data of the electronic file into the skeleton version and omitting malware-insusceptible data of the electronic file from the skeleton version.

According to an example aspect, there are provided computer program products, each comprising computer-executable computer program code which, when the computer program code is executed on a computer, is configured to cause the computer to carry out a method according to any one of the aforementioned method-related example aspects of the present invention, including any developments and/or a modifications thereof.

Any one of the computer program products may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned example aspects of the present invention are set out herein with reference to the drawings and exemplifying embodiments of the present invention.

By way of exemplifying embodiments of the present invention, remote malware scanning is enabled, which is capable of reducing required traffic and bandwidth (and speeding up remote malware scanning) and/or impeding corruption of security and reliability.

An "object" used here may be any suitable block of data or code. The dynamic configuration performed by a second node of the network may comprise the second node defining one or more rules that define malware-susceptible data and/or malware-insusceptible data, these rules being sent to the first node.

BRIEF DESCRIPTION OF THE DRAWINGS

In the following, the present invention will be described in greater detail by way of non-limiting examples with reference to the accompanying drawings, in which.

DETAILED DESCRIPTION

The present invention is described herein with reference to particular non-limiting examples and to what are presently considered to be conceivable embodiments of the present invention. A person skilled in the art will appreciate that the present invention is by no means limited to these examples, and may be more broadly applied.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for enabling dynamic remote malware scanning, as described in more details below.

Figure 1:
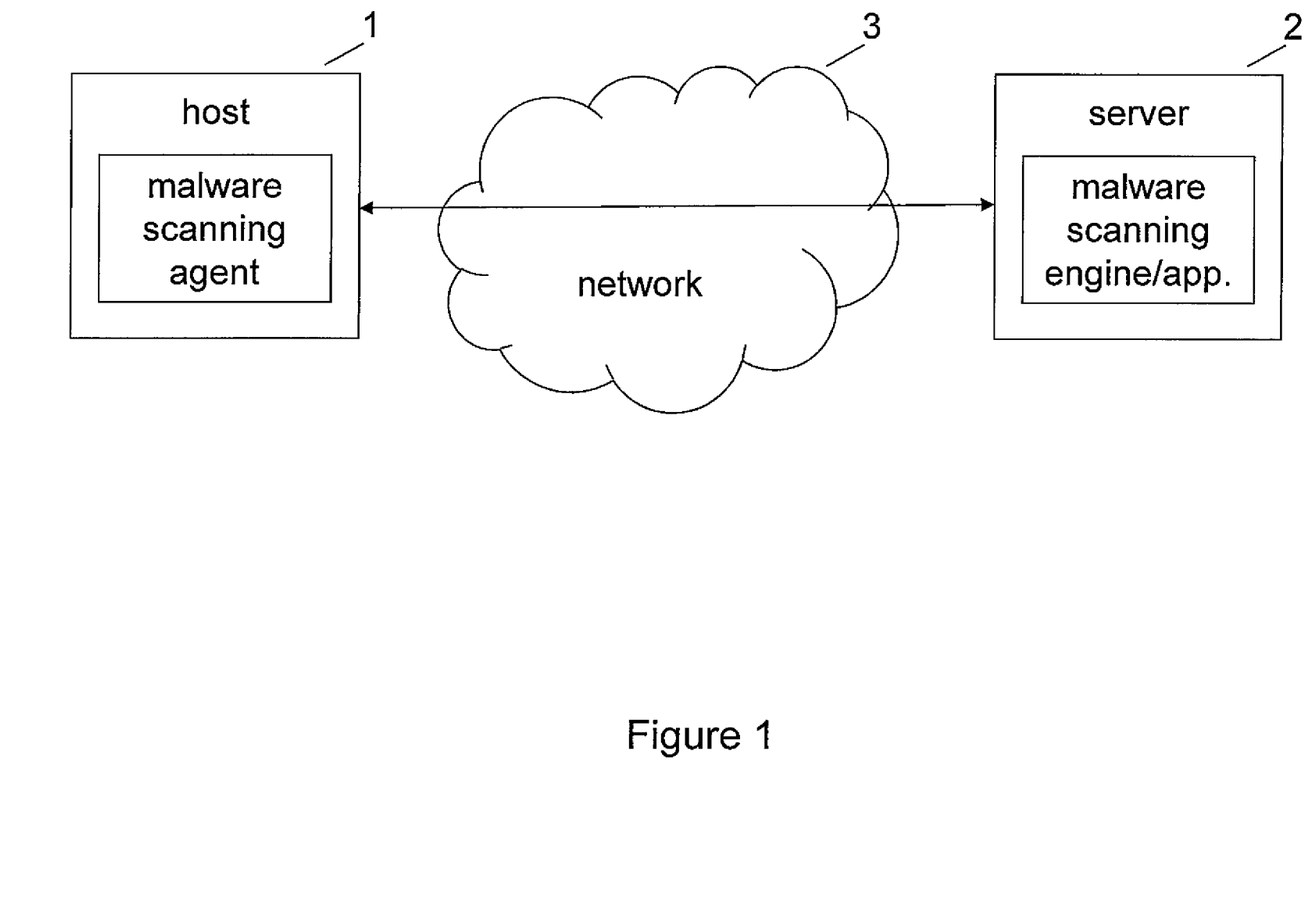
FIG. 1 shows a schematic diagram illustrating a system configuration, for which exemplifying embodiments of the present invention are applicable.

FIG. 1 shows a schematic diagram illustrating a system configuration, for which exemplifying embodiments of the present invention are applicable.

As shown in FIG. 1, exemplifying embodiments of the present invention generally relate to a system configuration in which a host 1 and a server 2 are connected via a network 3. Here, the host 1 exemplifies any computer or communication system (including a single device or a combination of devices), on which malware scanning is to be performed (remotely at/by the server). For example, the host 1 may include a personal computer, a personal communication device, a network-enabled device, a client, a firewall, a mail server, a proxy server, a database server, or the like. The server 2 exemplifies any computer or communication system (including a single device or a combination of devices), on which malware scanning is performed (of/for the host 1). For example, the server 2 may include a security entity or a backend entity of a security provider, or the like. According to exemplifying embodiments of the present invention, remote malware scanning of/for the host 1 at/by the server 3 can be realized using a malware scanning agent being installed/arranged at the host 1 (like e.g. an anti-virus client function) and a malware scanning engine or application being installed/arranged at the server 3 (like e.g. an anti-virus server function).

The network 2 exemplifies any computer or communication network, including e.g. a (wired or wireless) local area network like LAN, WLAN, Ethernet, or the like, a (wired or wireless) wide area network like WiMAX, GSM, UMTS, LTE, or the like, and so on. Hence, the host 1 and the server 2 can but do not need to be located at different locations. For example, the network 3 may be any kind of TCP/IP-based network. Insofar, communication between the host 1 and the server 2 over the network 3 can be realized using for example any standard or proprietary protocol carried over TCP/IP, and in such protocol the malware scanning agent at the host 1 and the malware scanning engine or application at the server 3 can be represented on/as the application layer.

Figure 2:
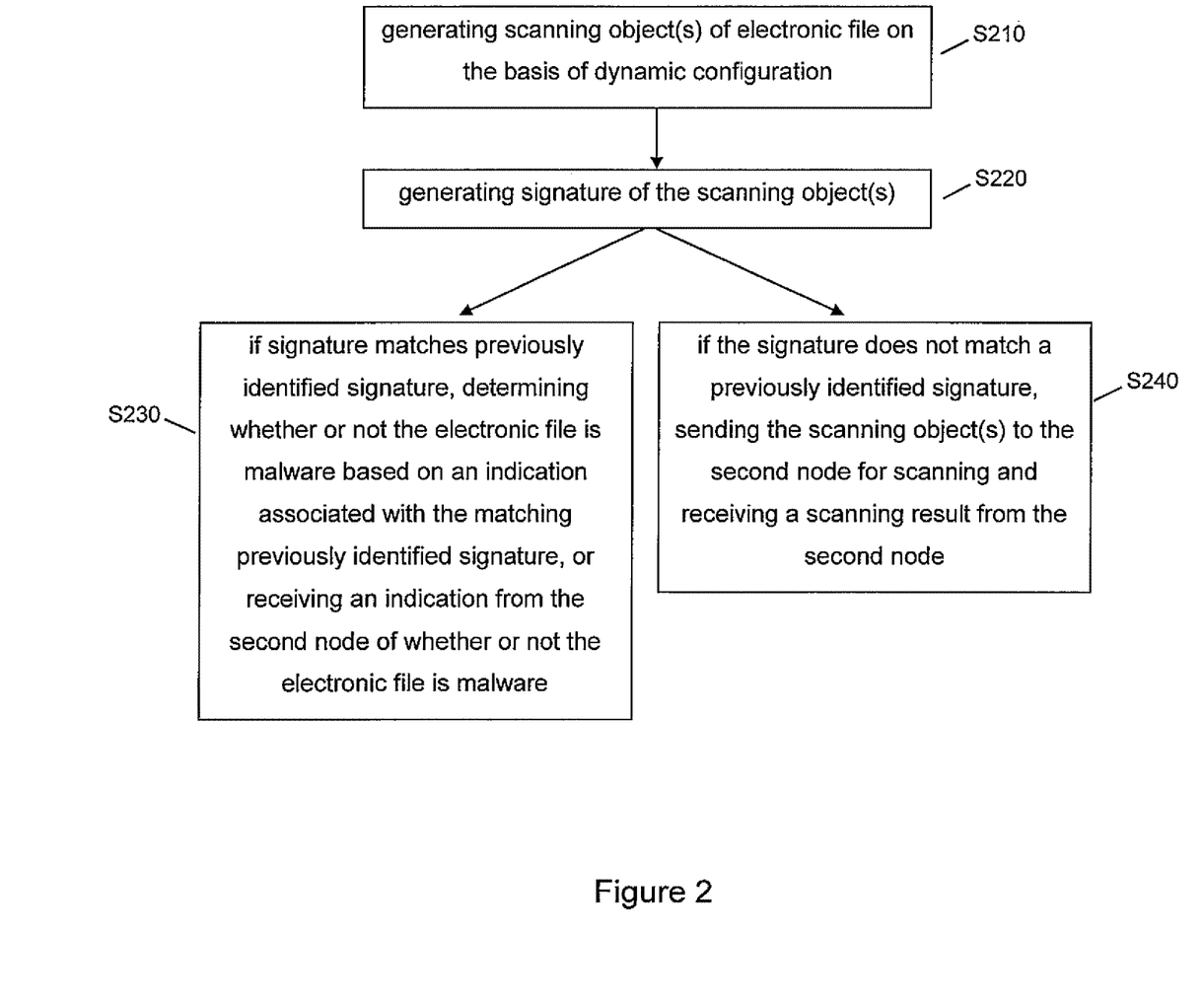
FIG. 2 shows a flowchart illustrating an example of a method, operable at a first node, according to exemplifying embodiments of the present invention.

FIG. 2 shows a flowchart illustrating an example of a method, which may be operable at a first node, according to exemplifying embodiments of the present invention. The thus illustrated method is for example operable at the host as illustrated in FIG. 1 (e.g. by or using the malware scanning agent thereof).

As shown in FIG. 2, a method according to exemplifying embodiments of the present invention comprises an operation (S210) of generating one or more scanning objects of an electronic file to be scanned for malware on the basis of a dynamic configuration provided to a first node of a network (for example, a host) by a second node of the network (for example, a server), and an operation (S220) of generating a signature of the scanning object(s). The method further comprises, if the signature matches a previously identified signature, an operation (S230) of determining whether or not the electronic file is malware based on an indication associated with the matching previously identified signature, or receiving an indication from the second node of whether or not the electronic file is malware; and if the signature does not match a previously identified signature, an operation (S240) of sending the scanning object(s) to the second node for scanning and receiving a scanning result from the second node. The second node may be a server as illustrated in FIG. 1.

Figure 3:
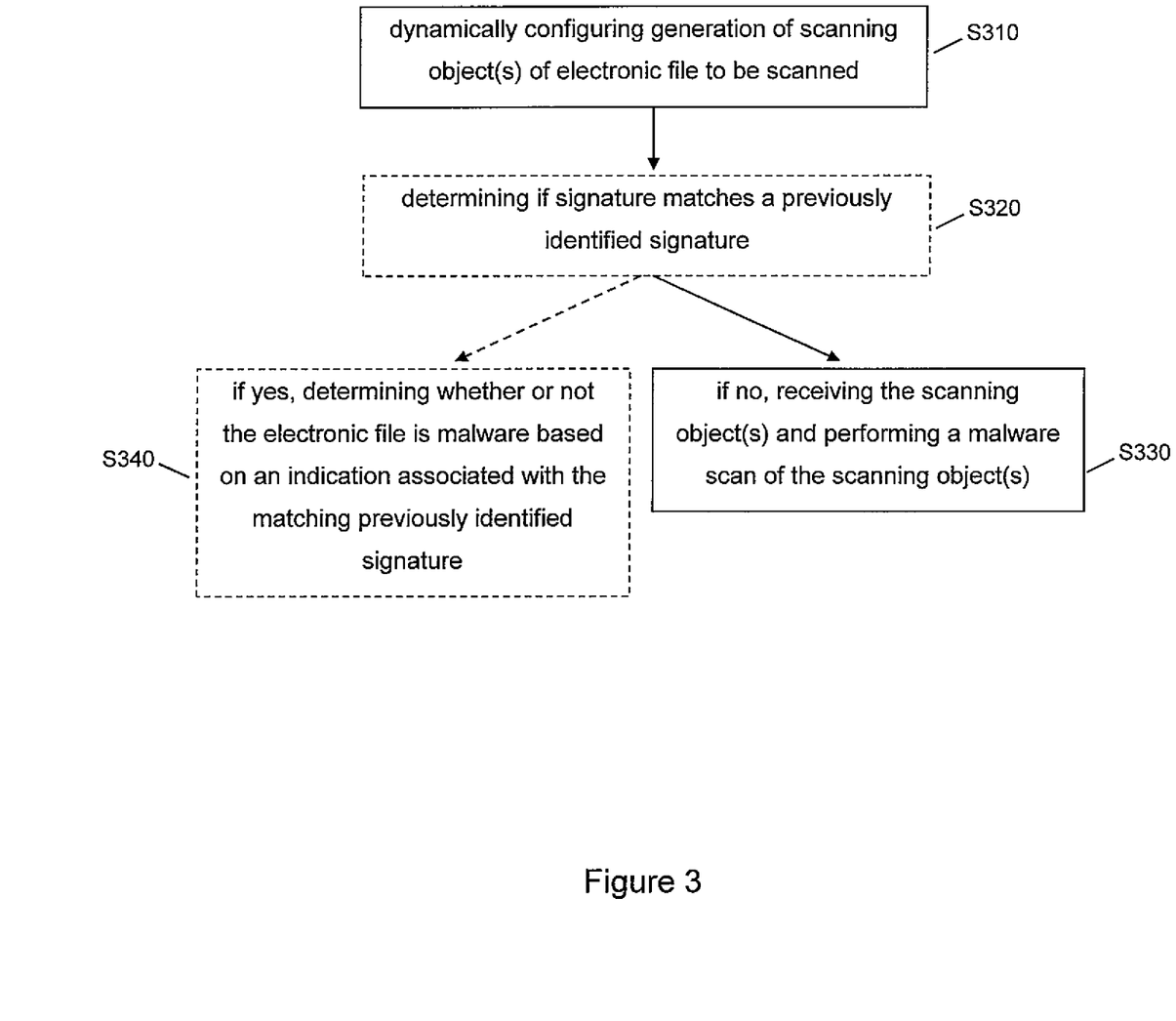
FIG. 3 shows a flowchart illustrating an example of a method, operable at a second node, according to exemplifying embodiments of the present invention.

FIG. 3 shows a flowchart illustrating an example of a method according to exemplifying embodiments of the present invention. The thus illustrated method is for example operable at the server as illustrated in FIG. 1 (e.g. by or using the malware scanning engine or application thereof).

As shown in FIG. 3, a method according to exemplifying embodiments of the present invention comprises an operation (S310) of dynamically configuring, at a second node such as a host, generation of one or more scanning objects of an electronic file at a first node such as the host as illustrated in FIG. 1, and an operation (S320) of determining if a signature of the scanning object(s) matches a previously identified signature, wherein the signature of the scanning object(s) is generated at the first node. The method further comprises, if the signature matches a previously identified signature, an operation (S340) of determining whether or not the electronic file is malware based on an indication associated with the matching previously identified signature, and, if the signature does not match a previously identified signature, an operation (S330) of receiving the generated scanning object(s) of the electronic file from the first node at the second node, and performing, at the second node, a malware scan of the received scanning object(s). The operation (S320) of determining if the signature matches a previously identified signature may be carried out at the first node or the second node. The operation (S340) of determining whether or not the electronic file is malware based on an indication associated with the matching previously identified signature may be carried out at the first node or the second node.

According to exemplifying embodiments of the present invention, the at least one scanning object of the identified electronic file (as referred to above in connection with any one of FIGS. 2 and 3) is generated by using malware-susceptible data of the identified electronic file and neglecting malware-insusceptible data of the identified electronic file. Here, malware-susceptible data refers to any parts of an electronic file, which may be subject, prone or vulnerable to malware (such as virus injection), while malware-insusceptible data refers to any parts of an electronic file, which are (typically) not subject, prone or vulnerable to malware (such as virus injection). Accordingly, the malware-susceptible data is sufficient to be scanned for evaluating whether the original file as such is malicious or, stated in other words, corrupted by malware. For example, the malware-susceptible data can be sufficient to be able to check all possible signatures of the original file.

According to exemplifying embodiments of the present invention, the at least one scanning object of the identified electronic file can be generated in various ways. As a non-limiting example, malware-susceptible data or parts/portions of the electronic file can be picked (or read, copied, etc.) from the electronic file, and the thus picked (or read, copied, etc.) data or parts/portions can then be employed for remote malware scanning. As another non-limiting example, a skeleton version of the electronic file can be created by copying malware-susceptible data or parts/portions of the electronic file into the skeleton version and omitting malware-insusceptible data or parts/portions of the electronic file from the skeleton version. Such skeleton version can but does not need to form a physical file or a specific file (type/format) as such, while a mere picking (or reading, copying, etc.) does usually not result in a physical file or a specific file (type/format) anyway.

As evident from the above, scanning objects actually employed for the remote malware scanning can differ in any one of number, type/format, structure, and contents. For example, different scanning objects can be employed depending on the type/format, structure, and/or contents of the electronic file to be scanned, the kind of involved entities, the underlying malware scanning mechanism, algorithm or scheme, or any other criterion with regard to the remote malware scanning to be performed thereon.

In brief, it can be said that the at least one scanning object of the electronic file to be scanned is indicative of those data or parts/portions of this file, which are relevant/significant for malware scanning, i.e. those data or parts/portions which is/are sufficient (for representing the original file) for determining whether or not the original file as such is malicious or, stated in other words, corrupted by malware.

As regards the relevance of data or parts/portions of a file for malware scanning, it is noted that many types of files contain one or more of exploit data (such as e.g. payload or user data) or the like and executable and/or resource data or the like on the other hand, which can exemplify malware-susceptible data, and other data (different from those mentioned before), such as any one or more of non-exploit data, non-executable data, non-resource data or the like, on the other hand, which can exemplify malware-insusceptible data. For example, APK (Android Application Package) files typically contain a lot of image, movie and/or sound data. For a game installed (e.g. of 1 GB) with an APK file, 90% of the content may be image, movie and/or sound data. With such an electronic file, such image, movie and/or sound data, which can be regarded as non-exploit data can be omitted from (i.e. not copied into) a skeleton version of the file, while any other data including e.g. exploit and/or executable and/or resource data can be copied into a skeleton version of the file, such that the skeleton version of the file actually represents a partial copy of the underlying file (containing only malware-susceptible data thereof). For example, with PE (Portable Executable) files, non-exploit data can be neglected, while any other data including e.g. exploit and/or executable and/or resource data can be picked (or read, copied, etc.) so as to represent at least one scanning object, such that the at least one scanning object actually represents relevant/significant data or parts/portions of the underlying file (containing only malware-susceptible data thereof).

Accordingly, the generation of the at least one scanning object according to exemplifying embodiments of the present invention makes use of the fact that only certain parts of an electronic file are needed for enabling malware scanning, and thus only such parts are to be sent (i.e. uploaded) to a remote entity for enabling remote malware scanning. Insofar, exemplifying embodiments of the present invention are applicable to any such electronic file, including for example a file of an Android Application Package (APK), a Portable Executable (PE), a Microsoft Soft Installer (MSI) or any other format capable of distributing and/or installing application software or middleware on a computer.

To further increase the efficiency of the process of determining whether or not an electronic file is malware, and to avoid unnecessary malware scanning of a scanned object(s), a signature of the at least one scanning object is generated that can be used to determine whether or not the electronic file associated with the signature has been previously identified as malware (or has been identified as "clean"). A signature is characteristic of the scanned object, and contains less data than the scanned object; the signature may be a minimum of data required to represent the characteristics of the scanned object. The signature of the at least one scanning object may be generated at the first node, or at another node. It is then determined whether the signature matches a previously identified signature. The determination of whether the signature matches a previously identified signature may be carried out at the first node, the second node, or another node; if the determination is carried out at the second node or another node, the first node may send a request to the second node or the other node to carry out the determination, and receive a result of the determination from the second node or the other node. A database of previously identified signatures may be maintained at the first node, the second node, or another node. The signature may be compared with previously identified signatures stored in the database at the first node, the second node, or another node.

If the signature matches a previously identified signature then it is determined whether or not the electronic file associated with the signature is malware, based on an indication associated with the matching previously identified signature. The indication associated with the matching previously identified signature may be stored in a database maintained at the first node, the second node, or another node. The determination of whether or not the electronic file is malware may be carried out at the first node, the second node, or another node; if the determination is carried out at the second node or the other node the first node may receive an indication of whether or not the electronic file is malware from the second node or the other node, and such an indication may be received together with the result of the determination of whether the signature matches a previously identified signature.

The indication associated with a previously identified signature may show that the scanned object(s) from which the previously identified signature was generated was scanned previously and the associated electronic file was found to be malware, or to contain malware; alternatively, the indication may show that the electronic file was found to be clean (i.e., that it was not, or did not contain, malware). In this way, the amount of data that must be transmitted is reduced (because the signature contains less data than the scanned object(s)), and unnecessary repetition of scanning of scanned object(s) is prevented. If it is determined that the signature does not match a previously identified signature then the scanning object(s) is sent to the second node for scanning, and a result of the scanning is sent from the second node to the first node. The result of the scanning may, for example, identify the electronic file associated with the signature as malware; or may identify the electronic file as being clean.

Figure 4:
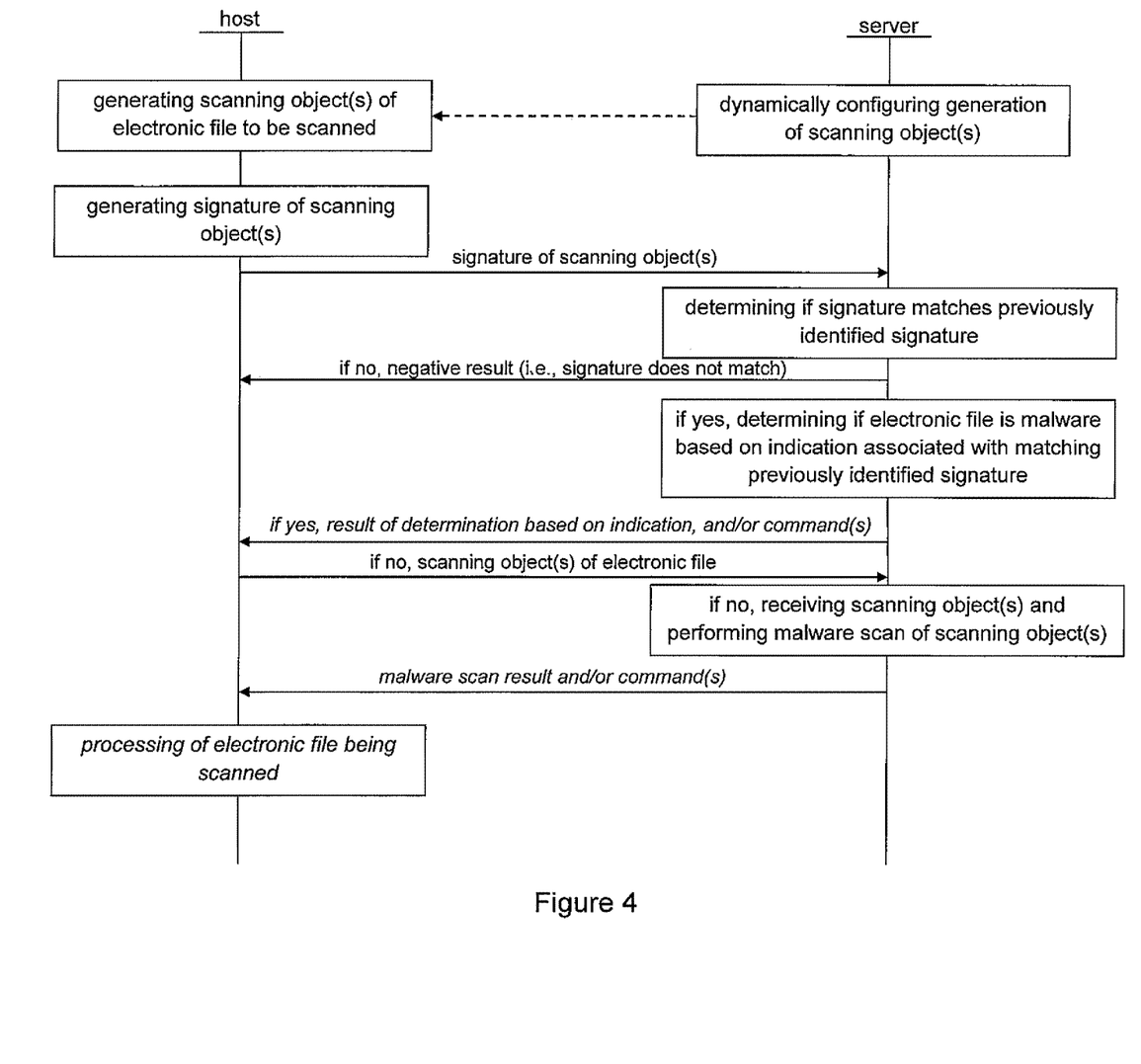
FIG. 4 shows a diagram illustrating an example of a procedure of dynamic remote malware scanning according to exemplifying embodiments of the present invention.

FIG. 4 shows a diagram illustrating an example of a procedure of dynamic remote malware scanning according to exemplifying embodiments of the present invention.

Basically, FIG. 4 illustrates the cooperation or interrelation between the operation of the first node, i.e. the method of/at the host illustrated in FIG. 2, and the operation of the second node, i.e. the method of/at the server illustrated in FIG. 3. Accordingly, reference is made to the above description of FIGS. 2 and 3 for details.

As indicated above, the generation and checking of a signature of at least one scanning object of the file to be scanned, and the communication, if necessary, of the at least one scanning object of the file to be scanned is beneficial for reducing required traffic and bandwidth over the network (and speeding up remote malware scanning).

As indicated by a dashed arrow in FIG. 4, the server operation of dynamically configuring generation of at least one scanning object of an electronic file to be scanned for malware at the first node (S310) acts on the host operation of generating at least one scanning object of the identified electronic file (S210). Stated in other words, the dynamic configuration by the second node, upon which the host performs the scanning object generation, is established by the dynamic configuration operation of the server. Accordingly, the generation of the at least one scanning object of the file to be scanned, can be dynamically controlled by/from the remote entity performing the actual malware scanning of the file in question, e.g. the server. Further details in this regard are described below with reference to FIG. 5.

In FIG. 4, the generation of a signature of the scanning object(s) (S220) is carried out at the first node (host).

In the example procedure of FIG. 4 a step of determining if the signature matches a previously identified signature (S320) is carried out at the second node. If the signature does not match a previously identified signature, the negative result of the determination may be sent to the first node. The scanning object(s) may then be sent to the second node for malware scanning. If the signature matches a previously identified signature then this result of the determination may be sent to the first node, or the next step (determining if the electronic file is malware) may be carried out at the second node.

The step of determining if the signature matches a previously identified signature may be carried out at the first node, or another node. If the step of determining if the signature matches a previously identified signature is carried out at the first node, a positive result of the determination (i.e., that the signature matches a previously, identified signature) may be sent to the second node, or may be retained at the first node. If the determination is carried out at another node, the result of the determination may be sent to the first node or the second node.

In the example procedure of FIG. 4, the step of determining if the electronic file is malware based on an indication associated with the matching previously identified signature (S230, S340) is carried out at the second node (server); in that case, the second node may send an indication of whether or not the electronic file is malware to the first node. The indication of whether or not the file is malware may be the result of the determination of whether or not the electronic file is malware.

The step of determining if the electronic file is malware based on an indication associated with the matching previously identified signature may be carried out at the first node, or another node.

If it is possible to determine whether or not the electronic file is malware based on an indication associated with a matching previously identified signature, it may not be necessary to send the scanning object(s) to the second node for malware scanning.

In any case, if it is determined that the signature does not match a previously identified signature, the scanning object(s) is sent from the first node to the second node, and the malware scan of the scanning object(s) is carried out at the second node.

As indicated by italics typeface in FIG. 4, a procedure according to exemplifying embodiments of the present invention may additionally comprise an operation of transferring a result of a determination based on the indication and/or commands, or a malware scan result and/or commands (corresponding to the malware scan result), from the server to the host, and an operation of processing the electronic file being scanned on the basis of the thus received determination result or malware scan result and/or commands (corresponding to the malware scan result) from the server at the host. For example, when the server recognizes that the scanned file is corrupted by a virus (as a result of the determination based on the indication associated with the matching previously identified signature, or as a result of the malware scan being performed on the at least one scanning object of the file), the server can notify the host (or any other relevant entity) accordingly. Also, the server may take or initiate measures with regard to the malware scan result. For example, in the above case, the server may disinfect the file from the virus, or instruct the host to perform such virus disinfection (wherein such instruction may include respective commands on how such virus disinfection or the like can or is to be performed).

Figure 5:
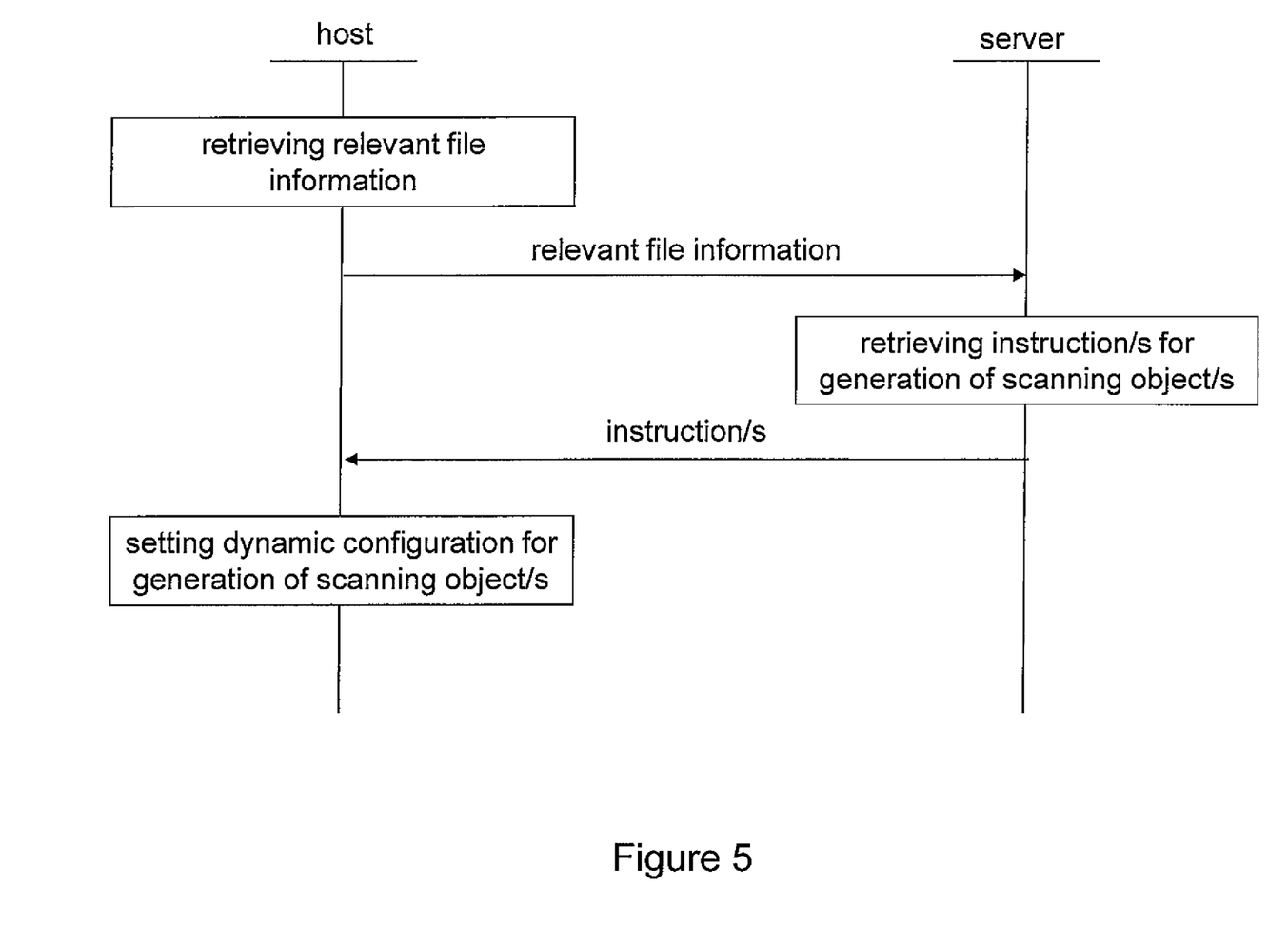
FIG. 5 shows a diagram illustrating an example of a procedure of dynamic configuration according to exemplifying embodiments of the present invention.

FIG. 5 shows a diagram illustrating an example of a procedure of dynamic configuration according to exemplifying embodiments of the present invention.

As shown in FIG. 5, a procedure of dynamic configuration according to exemplifying embodiments of the present invention comprises an operation of retrieving relevant file information for the identified electronic file at the host, whereupon the retrieved relevant file information is transferred from the host to the server and received at the server accordingly. The retrieval of relevant file information can be accomplished by way of extracting of certain information from the file, fetching of certain information from one or more local or remote storages/databases on the basis of an analysis of the file, or the like. Further, the present procedure comprises an operation of retrieving one or more instructions for generation of at least one scanning object of the identified electronic file on the basis of the received relevant file information at the server, whereupon the retrieved one or more instructions are transferred from the server to the host (for setting a dynamic configuration for generation of at least one scanning object of the identified electronic file at the host) and received at the host accordingly. The retrieval of one or more instructions can be accomplished by way of analysis and processing of the received file information, look-up of one or more corresponding local or remote storages/databases (in which a mapping of file types/formats and/or any other file information with respective suitable measures is recorded), or the like. Still further, the present procedure comprises an operation of setting the dynamic configuration on the basis of the received one or more instructions at the host.

According to exemplifying embodiments of the present invention, the procedure of FIG. 5 may be autonomous/stand-alone or integrated in the procedure of FIG. 4. In the latter case, the procedure of FIG. 5 may be performed between the identifying operation and the generating operation at the host, and/or may be regarded as part or implementation of the configuring operation at the server. Accordingly, the generation of the at least one scanning object of the file to be scanned, can be dynamically controlled by/from the remote entity performing the actual malware scanning of the file in question, e.g. the server.

According to exemplifying embodiments of the present invention, the relevant file information may include of file type/format, file size, file permissions, libraries used, file structure, file header, and/or file path, and the one or more instructions may include an instruction on whether or not the at least one scanning object is to be generated for the identified electronic file and/or an instruction on how the at least one scanning object is to be generated for the identified electronic file. Further, the instruction on how the at least one scanning object is to be generated for the identified electronic file may include indication of malware-susceptible data to be used (e.g. to be picked or to be copied into a skeleton version) and/or malware-insusceptible data to be neglected (e.g. to be disregarded/dismissed or to be omitted from a skeleton version) and/or an indication of type/format and/or structure and/or contents of the at least one scanning object to be generated. Thereby, it can for example be indicated whether the scanning object shall contain or represent one or more parts/portions of the file (and which ones), i.e. which number of scanning objects (with which data) is requested, or a skeleton version of the file.

More specifically, the host may contact the server and tell about one or more of file size, permissions, libraries used, file structure, file header, path and other parameters. Then, the server may respond with an instruction whether to upload the whole file or to generate a (reduced) scanning object thereof for remote malware scanning, and, if a (reduced) scanning object is deemed sufficient, the instruction can also contain a detailed recipe (or, stated in other words, a mechanism, algorithm or scheme) how the (reduced) scanning object can or is to be generated (or a distinct instruction may be transmitted to this end). For example, the server may instruct to upload the entire file when the file information indicates a file type/format of .pdf, while the server may instruct the generation of a (reduced) scanning object of the file, which contains or represents only image, movie and/or sound data thereof (or a part of such data being indicated accordingly), when the file information indicates a file type/format of .apk. In the latter case, the server may also instruct how the data to be used are to be coded and/or structured in the scanning object of the file, and which additional data or information are to be notified either in or together with the scanning object (if any). So, the further processing of the file in question at the host can be dynamically controlled by the server. In the case that a scanning object of the electronic file is generated, it is not always necessary to upload the scanning object to the server for malware scanning. A signature of the scanning object is generated, and it is determined if the signature matches a previously identified signature. The existence of a previously identified signature means that a scanning object with a signature substantially identical to that generated for the electronic file was scanned previously. The result of that previous scan (i.e., whether or not the electronic file associated with the previously identified matching signature was malware) is provided as an indication associated with the previously identified matching signature, and that indication facilitates the determination of whether or not the electronic file is malware. If the generated signature does not match any previously identified signature, then there is no prior knowledge of whether or not the electronic file associated with the generated signature is (or is likely to be) malware, and in that case it is necessary to send the scanned object(s) to the server for malware scanning.

As indicated above, such dynamic control/configuration is beneficial for impeding corruption of security and reliability of remote malware scanning. This is essentially because such dynamic control/configuration according to exemplifying embodiments of the present invention is flexible/adjustable and does not require any static mechanisms which can be spied out e.g. by a malware author or any malicious entity. Namely, having static codes or mechanisms for the generation of the at least one scanning object of the file to be scanned is dangerous as there can be malware which hides part or all of its components so as to be regarded/handled as malware-insusceptible data, e.g. into a data type (such as image, movie and/or sound data) that is filtered out (i.e. omitted). Such circumvention of the remote malware scanning technique can be prevented when the codes or mechanisms for the generation of the at least one scanning object of the file to be scanned are kept flexible/adjustable and controllable, like with the aforementioned exemplifying embodiments of the present invention.

For example, when it is once recognized by a security provider (operating the server) that (and how) a malicious entity has tried to hide malware in sound data of an APK file, this may be recorded in a storage/database. Using corresponding file information from the host (which indicate an APK file type, and potentially even suggest that a comparable attack might be relevant), the server may then retrieve such information (together with meanwhile devised and recorded countermeasures) from this storage/database and use the same for instructing the host to set the dynamic configuration for the scanning object generation accordingly. Also, such information can be employed in the subsequent malware scan (and disinfection) operation as well. In this example, the server provides instructions to the host for generating the scanning object of an APK file after a first recognition that a malicious entity has tried to hide malware in the sound data of the APK file. When such a scanning object is generated for the first time, it is likely that the signature of the scanning object (where the signature is generated at the host) will not match any previously identified signature, and the scanning object may then be sent to the server for malware scanning. The unique signature for the scanning object of the APK file will be recorded (in a storage/database, which may be at the host, the server, or another node), and the result of the first malware scanning of the scanning object of the APK file may be recorded as an indication associated with the recorded signature; for example, the indication may show that the APK file from which the signature was generated (indirectly, via the scanning object of the APK file) is, or contains, malware, or that the APK file is clean. In the future analysis of another APK file, a scanning object of the other APK file may be generated according to the dynamic configuration set by the server for such an APK file; a signature of the scanning object will then be generated at the host, and if the signature matches with a previously identified signature, for example the (previously) unique signature recorded for the first scanning object of such an APK file, then it can be determined if the other APK file is malware from the indication associated with the recorded signature. In this case it is not necessary to send the scanning object of the other APK file to the server for malware scanning. If the signature does not match a previously identified signature then the scanning object of the other APK file may be sent to the server for malware scanning. Thus, previously experienced malware attacks can be used for continuously improving the remote scanning technique.

By virtue of exemplifying embodiments of the present invention, as described above, remote malware scanning is enabled, which is capable of reducing required traffic and bandwidth (and speeding up remote malware scanning) and/or impeding corruption of security and reliability.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, nodes and systems, including both software and/or hardware thereof.

Respective exemplifying embodiments of the present invention are described below referring to FIG. 6, while for the sake of brevity reference is made to the detailed description of respective corresponding configurations/setups, schemes, methods and functionality, principles and operations according to FIGS. 1 to 5.

Figure 6:
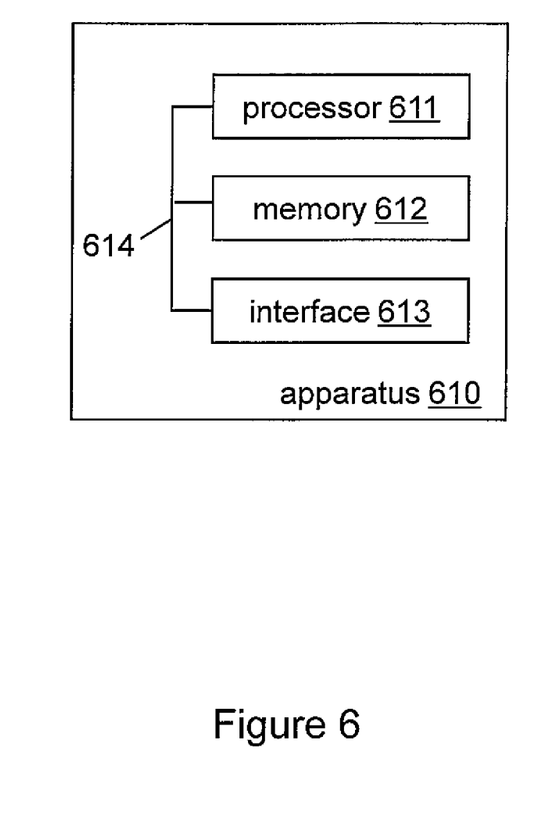
FIG. 6 shows a schematic diagram illustrating an example of a structure of an apparatus according to exemplifying embodiments of the present invention.

In FIG. 6, the solid line blocks are basically configured to perform respective methods, procedures and/or functions as described above. The entirety of solid line blocks are basically configured to perform the methods, procedures and/or functions as described above, respectively. With respect to FIG. 6, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIG. 6, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories, a display, or the like. Among others, one or more memories are provided for storing programs or program instructions for controlling or enabling the individual functional entities or any combination thereof to operate as described herein in relation to exemplifying embodiments.

In general terms, respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated devices/apparatuses are suitable for use in practicing one or more of the exemplifying embodiments of the present invention, as described herein.

FIG. 6 shows a schematic diagram illustrating an example of a structure of an apparatus according to exemplifying embodiments of the present invention.

As indicated in FIG. 6, an apparatus 610 according to exemplifying embodiments of the present invention may comprise at least one processor 611 and at least one memory 612 (and possibly also at least one interface 613), which may be operationally connected or coupled, for example by a bus 614 or the like, respectively.

The processor 611 of the apparatus 610 is configured to read and execute computer program code stored in the memory 612. The processor may be represented by a CPU (Central Processing Unit), a MPU (Micro Processor Unit), etc., or a combination thereof. The memory 612 of the apparatus 610 is configured to store computer program code, such as respective programs, computer/processor-executable instructions, macros or applets, etc. or parts of them. Such computer program code, when executed by the processor 611, enables the apparatus 610 to operate in accordance with exemplifying embodiments of the present invention. The memory 612 may be represented by a RAM (Random Access Memory), a ROM (Read Only Memory), a hard disk, a secondary storage device, etc., or a combination of two or more of these. The interface 613 of the apparatus 610 is configured to interface with another apparatus and/or the user of the apparatus 610. That is, the interface 613 may represent a communication interface (including e.g. a modem, an antenna, a transmitter, a receiver, a transceiver, or the like) and/or a user interface (such as a display, touch screen, keyboard, mouse, signal light, loudspeaker, or the like).

The apparatus 610 may, for example, represent a (part of a) first node, such as host 1 in FIG. 1, or may represent a (part of a) second node, such as server 2 in FIG. 1. The apparatus 610 may be configured to perform a procedure and/or exhibit a functionality as described in any one of FIGS. 2 to 5.

When representing a (part of a) first node, such as host 1 in FIG. 1, the apparatus 610 or its processor 611 (possibly together with computer program code stored in the memory 612), in its most basic form, is configured to generate one or more scanning objects of the electronic file on the basis of a dynamic configuration provided to a first node of the network by a second node of the network, the dynamic configuration defining malware-susceptible data of the electronic file, and the scanning object(s) being generated by using the malware-susceptible data of the electronic file and neglecting malware-insusceptible data of the electronic file; generate a signature of the scanning object(s); and if the signature matches a previously identified signature, determine whether or not the electronic file is malware based on an indication associated with the matching previously identified signature, or receive an indication from the second node of whether or not the electronic file is malware; and if the signature does not match a previously identified signature, send the scanning object(s) to the second node for scanning and receiving a scanning result from the second node. The apparatus 610 or its processor 611 (possibly together with computer program code stored in the memory 612) may be further configured to determine if the signature matches a previously identified signature, and, if yes, determine whether or not the electronic file is malware based on an indication associated with the matching previously identified signature.

When representing a (part of a) second node, such as server 2 in FIG. 1, the apparatus 610 or its processor 611 (possibly together with computer program code stored in the memory 612), in its most basic form, is configured to dynamically configure generation of one or more scanning objects of an electronic file to be scanned for malware at a first node of the network, the dynamic configuration defining malware-susceptible data of the electronic file, and the generation including using the malware-susceptible data of the electronic file and neglecting malware-insusceptible data of the electronic file; and, if it is determined that a signature of the scanning object(s) does not match a previously identified signature, the signature of the scanning object(s) being generated at a first node of the network, receive the generated scanning object(s) of the electronic file from the first node, and perform a malware scan of the received scanning object(s). The apparatus 610 or its processor 611 (possibly together with computer program code stored in the memory 612), may be further configured to determine if a signature of the scanning object(s) matches a previously identified signature, wherein the signature of the scanning object(s) is generated at a first node of the network, and, if yes, determine whether or not the electronic file is malware based on an indication associated with the matching previously identified signature.

Accordingly, any one of the above-described schemes, methods, procedures, principles and operations may be realized in a computer-implemented manner.

Any apparatus according to exemplifying embodiments of the present invention may be structured by comprising respective units or means for performing corresponding operations, procedures and/or functions. For example, such means may be implemented/realized on the basis of an apparatus structure, as exemplified in FIG. 6 above, i.e. by one or more processors 611, one or more memories 612, one or more interfaces 613, or any combination thereof.

An apparatus according to exemplifying embodiments of the present invention, which represents a (part of a) first node, such as host 1 in FIG. 1, may comprise (at least) a unit or means for generating one or more scanning objects of the electronic file on the basis of a dynamic configuration provided to a first node of a network by a second node of the network, the dynamic configuration defining malware-susceptible data of the electronic file, and the scanning object(s) being generated by using the malware-susceptible data of the electronic file and neglecting malware-insusceptible data of the electronic file, a unit or means for generating a signature of the scanning object(s), a unit or means for if the signature matches a previously identified signature, determining whether or not the electronic file is malware based on an indication associated with the matching previously identified signature, or receiving an indication from the second node of whether or not the electronic file is malware, and a unit or means for, if the signature does not match a previously identified signature, sending the scanning object(s) to the second node for scanning and receiving a scanning result from the second node.

An apparatus according to exemplifying embodiments of the present invention, which represents a (part of a) second node, such as server 2 in FIG. 1, may comprise (at least) a unit or means for dynamically configuring generation of one or more scanning objects of an electronic file to be scanned for malware at a first node of the network, the dynamic configuration defining malware-susceptible data of the electronic file, and the generation including using the malware-susceptible data of the electronic file and neglecting malware-insusceptible data of the electronic file, a unit or means for determining if a signature of the scanning object(s) matches a previously identified signature, wherein the signature of the scanning object(s) is generated at a first node of the network, a unit or means for, if yes, determining whether or not the electronic file is malware based on an indication associated with the matching previously identified signature, and a unit or means for, if no, receiving the generated scanning object(s) of the electronic file from the first node, and performing a malware scan of the received scanning object(s).

For further details regarding the operability/functionality of the individual elements according to exemplifying embodiments of the present invention, reference is made to the above description in connection with any one of FIGS. 1 to 5, respectively.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof. A computer program product encompasses a computer memory encoded with executable instructions representing a computer program for operating/driving a computer connected to a network.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling dynamic remote malware scanning. Such measures could exemplarily comprise generating one or more scanning objects of the electronic file on the basis of a dynamic configuration provided to a first node of the network by a second node of the network, the dynamic configuration defining malware-susceptible data of the electronic file, and the scanning object(s) being generated by using the malware-susceptible data of the electronic file and neglecting malware-insusceptible data of the electronic file; generating a signature of the scanning object(s); and if the signature matches a previously identified signature, determining whether or not the electronic file is malware based on an indication associated with the matching previously identified signature, or receiving an indication from the second node of whether or not the electronic file is malware; and if the signature does not match a previously identified signature, sending the scanning object(s) to the second node for scanning and receiving a scanning result from the second node.

Even though the invention is described above with reference to the examples and exemplifying embodiments with reference to the accompanying drawings, it is to be understood that the present invention is not restricted thereto. Rather, it is apparent to those skilled in the art that the above description of examples and exemplifying embodiments is for illustrative purposes and is to be considered to be exemplary and non-limiting in all respects, and the present invention can be modified in many ways without departing from the scope of the inventive idea as disclosed herein.

The invention claimed is:

1. A method of scanning an electronic file for malware in a network, the method comprising:
at a first node, generating at least one scanning object of the electronic file on the basis of a dynamic configuration provided to the first node of the network by a second node of the network, the dynamic configuration including a definition of malware-susceptible data of the electronic file, and the at least one scanning object being generated by using the malware-susceptible data of the electronic file and neglecting malware-insusceptible data of the electronic file identified by said definition, and generating at least one signature of the at least one scanning object;
if the at least one signature matches a previously identified signature, determining whether or not the electronic file is malware based on an indication associated with the matching previously identified signature; and
if the at least one signature does not match a previously identified signature, sending the at least one scanning object from the first node to the second node for scanning and receiving at the first node a scanning result from the second node.

2. The method according to claim 1, further comprising:
sending a request to the second node for a determination of whether the at least one signature matches a previously identified signature, and receiving a determination result from the second node.

3. The method according to claim 2, wherein the indication from the second node of whether or not the electronic file is malware is received together with the determination result.

4. The method according to claim 1, further comprising:
retrieving, at the first node, relevant file information for the electronic file; transferring the retrieved relevant the information from the first node to the second node; receiving one or more instructions for generation of the at least one scanning of the electronic file from the second node at the first node; and setting the dynamic configuration on the basis of the received one or more instructions.

5. The method according to claim 4, said relevant the information including one or more of the type/format, file size, the permissions, libraries used, the structure, file header, and file path.

6. The method according to claim 4, said one or more instructions including at least one of an instruction on whether or not the at least one scanning object is to be generated for the electronic file and an instruction on how the at least one scanning object is to be generated for the electronic file.

7. The method according to claim 6, said instruction on how the at least one scanning object is to be generated for the identified electronic file including at least one of an indication of malware-susceptible data to be used and/or malware-insusceptible data to be neglected and an indication of type/format and/or structure and/or contents of the at least one scanning object to be generated.

8. The method according to claim 1, wherein generating the at least one scanning object of the identified electronic file comprises at least one of:
picking, from the electronic file, malware-susceptible data of the electronic file, and creating a skeleton version of the electronic file by copying malware-susceptible data of the electronic file into the skeleton version and omitting malware-insusceptible data of the electronic file from the skeleton version.

9. The method according to claim 1, wherein the electronic file to be scanned comprises a file of at least one of an Android Application Package (APIA), a Portable Executable (PE), a Microsoft Soft Installer (MSI) or any other format capable of distributing and/or installing application software or middleware on a computer.

10. The method according to claim 1, wherein
the first node comprises a malware scanning agent, and
the second node comprises a malware scanning engine or application.

11. The method according to claim 1, performed at the first node.

12. An apparatus, comprising:
a memory configured to store computer program code; and
a processor configured to read and execute computer program code stored in the memory,
wherein the processor is configured to cause the apparatus to perform:
at a first node, generating at least one scanning object of the electronic file on the basis of a dynamic configuration provided to the first node of a network by a second node of the network, the dynamic configuration including a definition malware-susceptible data of the electronic file, and the at least one scanning object being generated by using the malware-susceptible data of the electronic file identified by said definition and neglecting malware-insusceptible data of the electronic file, and generating at least one signature of the at least one scanning object; and
if the at least one signature matches a previously identified signature, determining whether or not the electronic file is malware based on an indication associated with the matching previously identified signature; and
it the at least one signature does not match a previously identified signature, sending the at least one scanning object from the first node to the second node for scanning and receiving at the first node a scanning result from the second node.

13. The apparatus according to claim 12, wherein the processor is further configured to cause the apparatus to perform:
sending a request to the second node for a determination of whether the at least one signature matches a previously identified signature, and receiving a determination result from the second node.

14. The apparatus according to claim 13, wherein the indication from the second node of whether or not the electronic file is malware is received together with the determination result.

15. A non-transitory computer-readable medium, comprising instructions which, when executed on at least one processor, cause the at least one processor to:
at a first node, generate at least one scanning object of the electronic file on the basis of a dynamic configuration provided to the first node of the network by a second node of the network, the dynamic configuration including a definition of malware-susceptible data of the electronic file, and the at least one scanning object being generated by using the malware-susceptible data of the electronic file and neglecting malware-insusceptible data of the electronic file identified by said definition, and generate at least one signature of the at least one scanning object;
if the at least one signature matches a previously identified signature, determine whether or not the electronic file is malware based on an indication associated with the matching previously identified signature; and
if the at least one signature does not match a previously identified signature, send the at least one scanning object from the first node to the second node for scanning and receiving at the first node a scanning result from the second node.

16. The non-transitory computer-readable medium of claim 15, wherein the at least one processor is further caused to:
send a request to the second node for a determination of whether the at least one signature matches a previously identified signature, and receive a determination result from the second node.

17. The non-transitory computer-readable medium of claim 16, wherein the indication from the second node of whether or not the electronic file is malware is received together with the determination result.

18. The non-transitory computer-readable medium of claim 15, wherein the at least one processor is further caused to:
retrieving, at the first node, relevant file information for the electronic file; transferring the retrieved relevant the information from the first node to the second node; receiving one or more instructions for generation of the at least one scanning of the electronic file from the second node at the first node; and setting the dynamic configuration on the basis of the received one or more instructions.

19. The apparatus according to claim 12, wherein the processor is further configured to cause the apparatus to perform:
retrieving, at the first node, relevant the information for the electronic file;
transferring the retrieved relevant the information from the first node to the second node;
receiving one or more instructions for generation of the at least one scanning of the electronic file from the second node at the first node; and
setting the dynamic configuration on the basis of the received one or more instructions.

20. The apparatus according to claim 19, wherein said relevant file information including one or more of file type/format, the size, file permissions, libraries used, file structure, the header, and the path.

* * * * *

UNITED STATES PATENT AND TRADEMARK OFFICE
CERTIFICATE OF CORRECTION

PATENT NO. : 11,032,313 B2
APPLICATION NO. : 15/046918
DATED : June 8, 2021
INVENTOR(S) : Juha Ylipekkala et al.

Page 1 of 1

It is certified that error appears in the above-identified patent and that said Letters Patent is hereby corrected as shown below:

In the Claims

Claim 5: Column 20, Line 37, delete "the" and insert --file--;
Line 38, delete "the" before the word permissions and replace with --file--;
Line 38, delete "the" before the word structure and replace with --file--.

Claim 9: Column 20, Line 64, delete "(APIA)" and replace with --(APK)--.

Claim 18: Column 22, Line 30, delete "the" after the word relevant and replace with --file--.

Claim 19: Column 22, Line 40, delete "the" before the word information and replace with --file--;
Line 42, delete "the" before the word information and replace with --file--.

Claim 20: Column 22, Line 51, delete "the" and replace with --file--;
Line 52, delete "the" before the word header and replace with --file-- and delete "the" before the word path and replace with --file--.

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*